(12) United States Patent
Larsson

(10) Patent No.: US 8,117,690 B1
(45) Date of Patent: Feb. 21, 2012

(54) MECHANICAL BABY STROLLER ROCKER

(76) Inventor: Malin Larsson, Los Angeles, CA (US)

(\*) Notice: Subject to any disclaimer, the term of this patent is extended or adjusted under 35 U.S.C. 154(b) by 0 days.

(21) Appl. No.: 12/804,753

(22) Filed: Jul. 28, 2010

(51) Int. Cl.
*A47D 9/02* (2006.01)
*A47D 9/04* (2006.01)
(52) U.S. Cl. ............................................. 5/108; 5/109
(58) Field of Classification Search ............. 5/108, 109, 5/915; 472/119
See application file for complete search history.

(56) References Cited

U.S. PATENT DOCUMENTS

| 2,884,651 | A | \* | 5/1959 | Garey | 5/109 |
| 3,048,419 | A | \* | 8/1962 | Fredman | 280/31 |
| 3,139,630 | A | \* | 7/1964 | Hunt | 5/109 |
| 7,159,254 | B1 | \* | 1/2007 | Voorting | 5/120 |

\* cited by examiner

*Primary Examiner* — Robert G Santos
(74) *Attorney, Agent, or Firm* — Andrew Schroeder; Law Office of Andrew Y. Schroeder

(57) ABSTRACT

A mechanical baby rocker includes a first cylinder, a second cylinder, a plurality of straps, and a motor. The first cylinder is telescopically affixed with the second cylinder. The first cylinder is actuated by the motor. The motor is housed within the second cylinder.

1 Claim, 2 Drawing Sheets

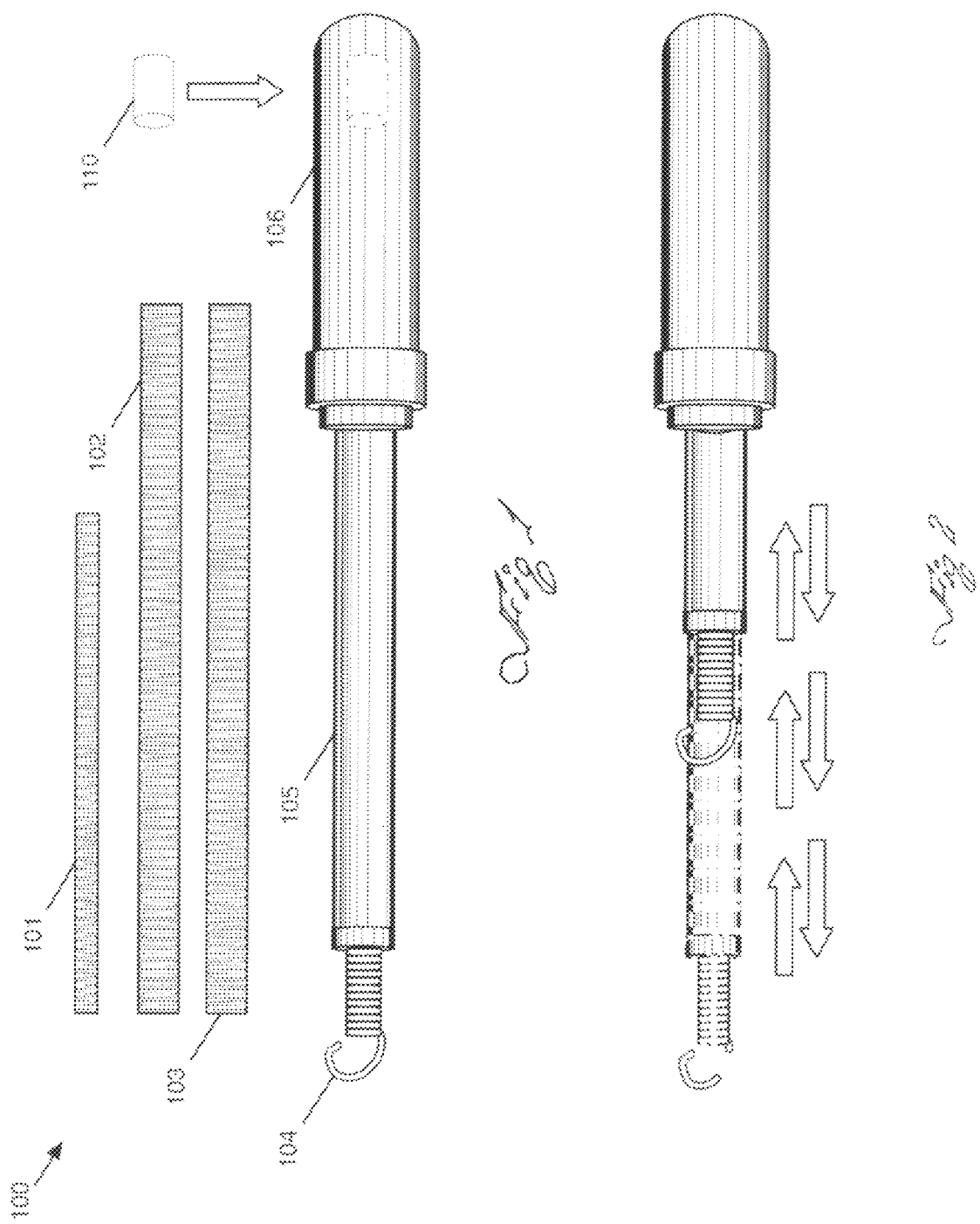

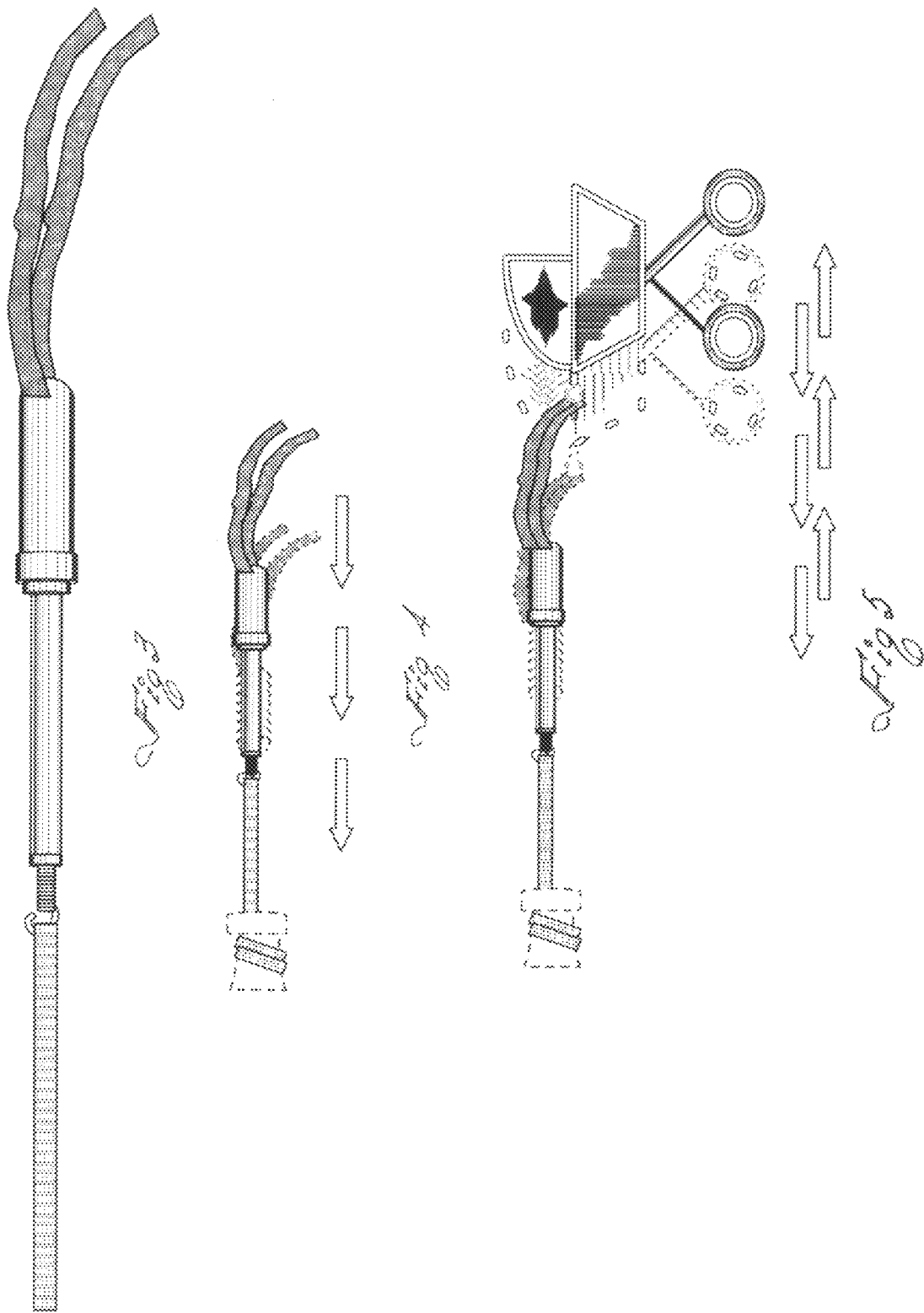

MECHANICAL BABY STROLLER ROCKER

FIELD OF THE INVENTION

The present invention is in the area of children's accessories and more particularly pertains to a mechanized apparatus for rocking a baby stroller or basket back and forth.

BACKGROUND OF THE INVENTION

Nowadays, modern-day mothers are burdened with multi-tasking. Many mothers must not only take care of their children, but they also have to work a full or part time job. Needless to say, many mothers raising a young baby are weary from all the necessary domestic chores. And one of the more important chores is the task of rocking a baby back and forth to induce them to calm down and sleep.

The back and forth motion which many mothers use to pacify a baby lets them know that their mother is close by and taking care of them. As a result, they usually stop crying. The problem is that babies are oftentimes awake during late night hours when their mothers would like to sleep. And the only way to make them stop crying is by rocking them back and forth.

Therefore, what is clearly needed in the art is an apparatus which can gently and safely rock a baby back and forth. This apparatus should be able to be used with either baby strollers, baby carriages, or similar baby carriers.

SUMMARY OF THE INVENTION

It is an object of the present invention to provide an apparatus to help rock a baby back and forth in a baby stroller, baby crib, or similar apparatus. This mechanical baby rocker is anchored to a door knob, table leg, handle or similar object on one end. On the other end, the mechanical baby rocker is pulling onto the handles or similar object to rock the baby back and forth.

BRIEF DESCRIPTION OF THE DRAWING FIGURES

FIG. 1 is a side view of a preferred embodiment of the present invention.

FIG. 2 is a side view of a preferred embodiment of the present invention.

FIG. 3 is a side view of a preferred embodiment of the present invention.

FIG. 4 is a side view of a preferred embodiment of the present invention.

FIG. 5 is a rear view of a preferred embodiment of the present invention.

DESCRIPTION OF PREFERRED EMBODIMENTS

According to a preferred embodiment of the present invention, a unique system and apparatus is used to rock a baby stroller or container back and forth. The present invention is described in enabling detail below.

For the purposes of the present invention, the baby rocker is meant to be used with a wide variety of baby strollers, carriages, etc. Moreover, the baby rocker is meant to also be used with other devices without wheels but which are shaped or designed such that they are curved in such a way so that they may be rocked back and forth.

FIG. 1 illustrates a preferred embodiment of the present invention. A mechanical baby rocker 100 includes a first cylinder 105, a second cylinder 106, a plurality of straps 101, 102, 103, and a motor 110. The first cylinder 105 is telescopically affixed with the second cylinder 106. The first cylinder 105 is actuated by the motor 110. The motor 110 is housed within the second cylinder 106.

It should be pointed out here that in some preferred embodiments, the mechanical baby rocker 100 may be powered with a hydraulic, pneumatic, or other type of motor. It is no consequence which type of motor is used with the present invention.

In some preferred embodiments the motor 110 is controlled by a chip which controls the amount of distance which the mechanical baby rocker 100 rocks back and forth. The motor 110 will also be told how fast or slow in which it is to move back and forth.

In some preferred embodiments there will be a strap for a door knob 101. The strap for a door knob 101 is affixed with the first cylinder 105. In some preferred embodiments, the strap for a door knob 101 is bound to the first cylinder through use of a hook. FIG. 1 also illustrates that in some preferred embodiments there may be at least one baby strap 102, 103. These baby straps are affixed with the second cylinder 106. These baby strap 102, 103 can be used to bind with the handle bars of a stroller or other baby crib or the like.

It should be noted here that the present invention is not meant to be only used with door knobs. The present invention can be used to actuate back and forth with a table leg, a table corner, a door jam, a refrigerator handle, etc.

It should be noted here that in some preferred embodiments the baby strap 102, 103 or the strap for a door knob 101 may be replaced with another analogous article of manufacture. Examples include hooks, cords, strings, chains, etc. The present invention is not to be construed as limiting in terms of the precise means by which the mechanical baby rocker 100 pulls on either the door knob or the baby stroller.

It will be apparent to the skilled artisan that there are numerous changes that may be made in embodiments described herein without departing from the spirit and scope of the invention. As such, the invention taught herein by specific examples is limited only by the scope of the claims that follow.

What is claimed is:

1. A mechanical baby rocker comprising:
   a first cylinder, a second cylinder, at least one baby strap; the at least one baby strap is affixed with the second cylinder, a strap for a door knob; the strap for a door knob is affixed with the first cylinder and a motor;
   the first cylinder is telescopically affixed with the second cylinder;
   the first cylinder is actuated by the motor;
   the motor is disposed within the second cylinder.

* * * * *